MAGNETIC DOMAIN WIRE SHIFT REGISTER

Filed Aug. 11, 1965

INVENTOR
R. A. KAENEL
BY Herbert M. Shapiro
ATTORNEY 3,452,337

MAGNETIC DOMAIN WIRE SHIFT REGISTER

Reginald A. Kaenel, Chatham, N.J., assignor to Bell Telephone Laboratories, Incorporated, New York, N.Y., a corporation of New York Filed Aug. 11, 1965, Ser. No. 478,911
Int. Cl. G11b *5/06;* G06k *7/08*
U.S. Cl. 340—174 9 Claims

ABSTRACT OF THE DISCLOSURE

A word recognizer comprising a domain wall medium employs a conductor coupled in a coded manner to preset positions along the medium. A magnetic domain propagated along the medium is inhibited if a pulse applied to the conductor does not correspond to the sense of the coupling to provide a field to advance the leading wall of the domain at the position so coupled. Only if a sequence of coded pulses matches the sequence of coded coupling senses of the conductor is the domain successfully propagated to an output position for detection.

This invention relates to information processing devices and, more particularly, to devices for recognizing characteristic information.

Devices for recognizing characteristic information, often termed word recognizers, are in widespread use in all types of communication and data processing systems. For example, in communication systems where a plurality of receivers are potentially capable of receiving a communication, each receiver includes, advantageously, a word recognizer for detecting a characteristic word designating the receiver to which the communication is addressed. In the absence of the characteristic word (address) designating a receiver, that receiver is disabled from receiving the communication. This transmission arrangement which time-shares a transmission medium is competitive with switching (tree)logic systems, primarily, to the extent that inexpensive word recognizers become available. Moreover, tree logic systems are impractical in certain instances such as in remote signaling systems as, for example, in personal signaling service systems.

An object of this invention is to provide a new and novel, relatively inexpensive word recognizer.

The foregoing and further objects of this invention are realized in one embodiment thereof wherein a magnetic wire domain wall shift register is turned to account. A stable reverse (magnetized) domain bounded by leading and trailing domain walls is nucleated in, and then propagated by a magnetic field along, the magnetic wire toward a remote sense conductor. A series of obstacles are encountered by the reverse domain, in accordance with this invention, as it is propagated along the magnetic wire. Each obstacle comprises a magnetic field of a polarity to inhibit propagation of the leading domain wall of the reverse domain. Each field is generated at a corresponding position of the wall in the magnetic wire in response to a mismatch between the polarity of a coupling of a conductor coupled to the wire at that position and the polarity of an input pulse applied to that conductor at a time when the wall is propagated to that position. The reverse domain, so inhibited, collapses in response to the next succeeding propagation pulse after such a mismatch and so reaches the sense conductor only if no mismatch appears. An output pulse indicates a correctly coded sequence of input pulses.

Accordingly, a feature of this invention is a means for generating a propagation-inhibiting field in a domain wall shift register in response to a mismatch between the polarity of a pulse applied to a conductor coupled to that register and the polarity of the corresponding coupling of that conductor.

The foregoing and further objects and features of this invention are understood more fully from a consideration of the following discussion rendered in conjunction with the accompanying drawing wherein.

Figure 1:
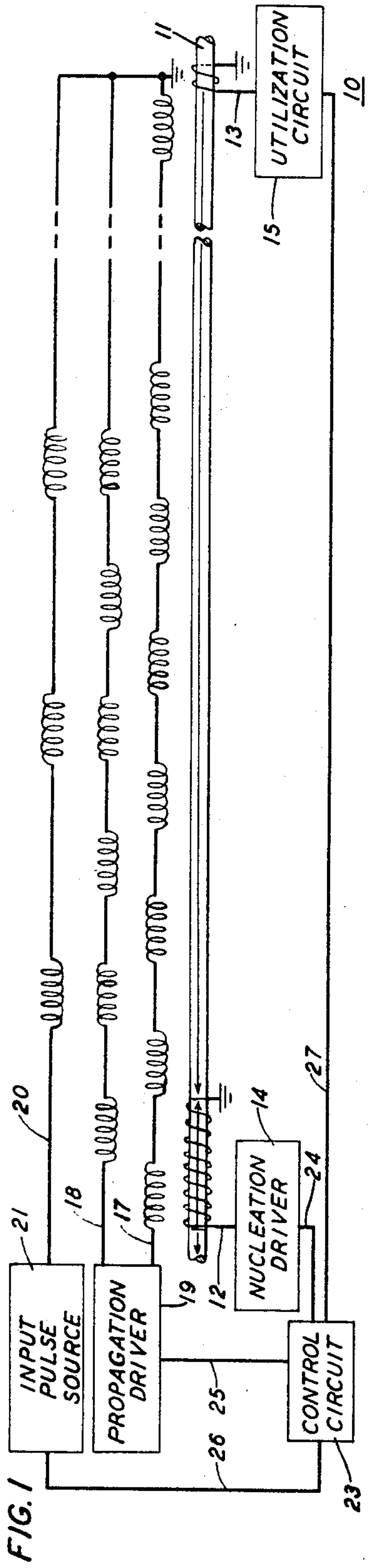
FIG. 1 is a schematic illustration of a word recognizer in accordance with this invention.

Specifically, FIG. 1 shows a word recognizer 10 comprising a magnetic wire 11 to opposite ends of which are coupled a nucleation conductor 12 and a sense conductor 13. Nucleation conductor 12 is connected between a nucleation driver 14 and ground, and sense conductor 13, similarly, is connected between a utilization circuit 15 and ground. First and second interleaved propagation conductors 17 and 18 couple magnetic wire 11 between the nucleation and the sense conductors. Although in practice the propagation conductors are usually wound about magnetic wire 11, the windings (couplings) are represented in FIG. 1 by interleaved windings spaced apart from wire 11 for the sake of clarity. The propagation conductors are connected between a propagation driver 19 and ground. An additional conductor 20 similarly is coupled to wire 11 at spaced apart positions specifically at positions corresponding to alternate positions coupled by conductor 18. Conductor 20, however, is coupled to wire 11 such that the polarity of the various couplings varies in a coded fashion as is explained more fully hereinafter. Conductor 20 is connected between an input pulse source 21 and ground. A control circuit 23 is connected to drivers 14 and 19, and to input pulse source 21 and utilization circuit 15 by means of conductors 24, 25, 26, and 27, respectively. The various drivers and circuits herein may be any such elements capable of operating in accordance with this invention.

The magnetic wire 11 comprises a material which includes re-entrant hysteresis characteristic. Such materials have the ability to maintain a stable state called a reverse domain herein in response to a first (nucleating) field in excess of a characteristic nucleation threshold and, further, by the ability to move that reverse domain therein in response to a second (propagating) field in excess of a characteristic propagation threshold and less than said nucleation threshold. Various materials for said wires and the use thereof in domain wall shift registers are well known in the art. Particularly advantageous materials are disclosed in copending application Ser. No. 405,692, filed Oct. 22, 1964, and now U.S. Patent No. 3,350,179, for D. H. Smith and E. M. Tolman.

For an illustrative operation of the circuit of FIG. 1 it is assumed that the word to be recognized is 100, represented by a positive and two negative pulses applied sequentially to conductor 20. In order to recognize the illustrative word, the couplings of conductor 20 to wire 11, viewed from left to right in FIG. 1, are poled in a corresponding manner. Specifically, the couplings of conductor 20 are poled (+, —, and —) such that a positive pulse applied to the conductor generates a pattern of fields in wire 11 tending to drive flux to the right at each coupling corresponding to a "one" in an input pulse code and to the left at each coupling corresponding to a "zero." The pattern of fields generated in wire 11 for a positive pulse applied to conductor 20 is shown in FIG.

Figure 3:
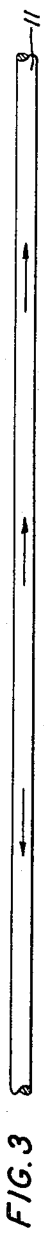

2 for the assumed illustrative word as arrows directed to the right, to the left, and to the left viewed from left to right in the figure. The pattern of fields generated in wire 11 for a negative pulse applied to conductor 20 is shown in FIG. 3 as arrows directed to the left, to the right, and to the right.

Operation is initiated, conveniently, in response to a timing pulse which normally precedes input information on conductor 20 under the control of a usually remote transmission source included, illustratively, in control circuit 23. In response to the timing pulse, nucleation driver 14, under the control of control circuit 23, pulses conductor 12 nucleating a reverse domain in wire 11. The reverse domain is represented in FIG. 1 by an arrow directed to the right in the portion of wire 11 coupled by conductor 12. A forward domain to which wire 11 is assumed initialized is represented by arrows directed to the left in wire 11. The reverse domain is separated from the remainder of the wire by domain walls as is well known. At a later time, under the control of control circuit 23, propagation driver 19 applies pulses, alternatively, to propagation conductors 17 and 18 for moving the reverse domain along the wire 11 toward sense conductor 13. To this end, the polarities of succeeding couplings of each of conductors 17 and 18 alternate as is well known, the operation thereof being well understood. A pulse, in addition, is applied to conductor 20 each time a negative pulse is applied to conductor 18, under the control of control circuit 23. For this purpose, control circuit 23 may include means for adjusting the propagation rate to the rate at which input pulses are applied. The advance of the reverse domain depends upon both the propagation pulses and the pulses applied to conductor 20. Only if the last-mentioned pulses are coded in a succession of positive and negative polarities which match the succession of positive and negative coupling polarities of conductor 20 to wire 11 will the reverse domain reach the portion of wire 11 coupled by sense conductor 13. Otherwise, the reverse domain is collapsed.

Figure 4:
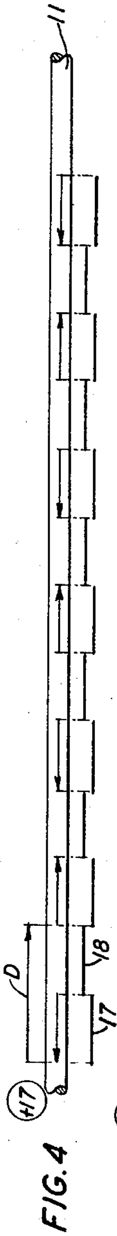

FIGS. 4 through 13 depict magnetic wire 11 with field configurations shown therein for various stages of operation. The sequence of figures shows the field configuration for each succeeding propagation pulse. The polarity of, and the propagation conductor to which, each propagation pulse is applied is represented by the encircled designation to the left of the magnetic wire 11 in each figure. In FIG. 4, for example, the field configuration is represented, from left to right as viewed, by a sequence of arrows directed alternately first to the left and then to the right. This field configuration is in response to, illustratively, the first propagation pulse which is a positive pulse applied to conductor 17 as indicated by the encircled +17 designation in the figure. The positions of the fields in wire 11 are defined by the positions of the couplings of the propagation conductors. The positions of the couplings of conductors 17 and 18 on wire 11 are represented by a series of overlapping spaced apart horizontal lines labeled 17 and 18 beneath the representation of wire 11 in FIG. 4. A reverse domain D represented, in an illustrative initial position, by a bounded arrow directed to the right in FIG. 4 extends as far as do a pair of adjacent couplings of conductor 17 and conductor 18.

Figure 5:
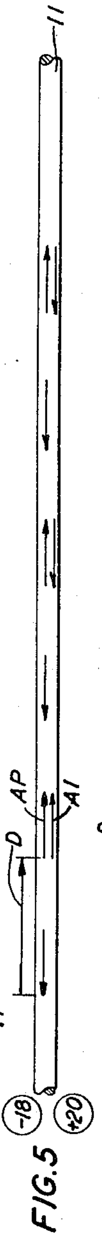

The second propagation pulse is a negative one applied to conductor 18 as indicated by the encircled −18 to the left of wire 11 in FIG. 5. The field configuration, in response, is shifted to the right as is clear from a comparison between FIGS. 4 and 5. The field directions, however, have the same pattern as shown in FIG. 4. It has been stated hereinbefore that the senses of the couplings in each of the propagation conductors alternate. FIGS. 4 and 5 illustrate the relatonship between the sense of the couplings in the two propagation conductors.

Further discussion of the illustrative propagation mechanism is unnecessary because it is well known in the art. But the various field configurations in response to further pulses in the propagation operation are illustrated in FIGS. 6 through 13 as arrows directed alternately to the right and to the left as a context in which the nature of conductor 20 and its over-all effect on the domain wall shift register in the adaptation thereof to word recognition is undrestood. Each of FIGS. 6 through 13 includes, for convenience, an encircled designation of the polarity of the propagation pulse and the designation of the propagation conductor to which it is applied. It may be recognized that the entire propagation pulse pattern is, illustratively, +17, −18, −17, +18, +17, −18, −17, +18, +17, −18, and −17, that is, an over-all pattern of a positive pulse on each of the propagation conductors followed by a negative pulse on each of the conductors. Of course, the directions of the arrows representing the field configuration generated by each of those pulses are opposite for positive and negative propagation pulses applied to a particular propagation conductor.

Figure 15:
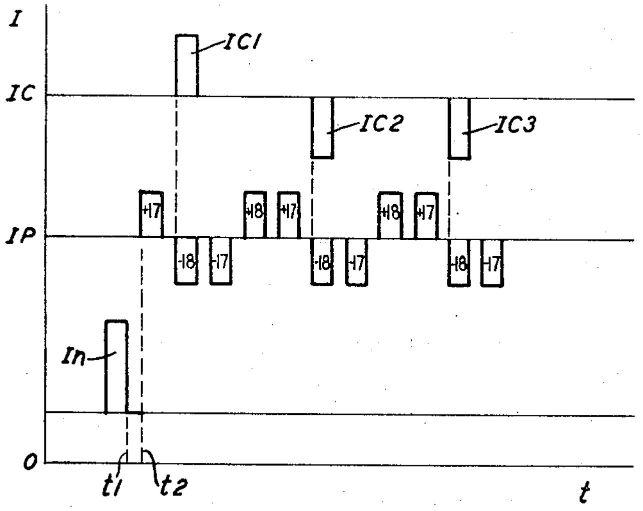
FIG. 15 is a diagram of the pulses applied to the word recognizer of FIG. 1 during operation.

The pattern of propagation pulses is depicted also in FIG. 15 with respect to the horizontal reference line designated I*p*. To this end, FIG. 15 is a pulse diagram representing current pulses with respect to time. The figure also depicts the initial nucleation pulse, designated I*n*, which terminates at a time $t_1$ illustratively prior to the onset of the propagation sequence at time $t_2$. FIG. 15 also depicts one positive and two negative pulses designated I*c*1, I*c*2, and I*c*3 representing coded pulses concurrent with negative propagation pulses applied to propagation conductor 18. For convenience, the propagation pulses as shown in FIG. 15 also include the designations of the polarity of the pulse and the identification of the conductor to which applied. These coded pulses, it is to be remembered, constitute the word to be recognized and, as such, represent the assumed word 100.

Figure 2:
FIGS. 2 through 14 are schematic illustrations of a portion of the word recognizer of FIG. 1 showing magnetic fields therein during operation.
Figure 9:
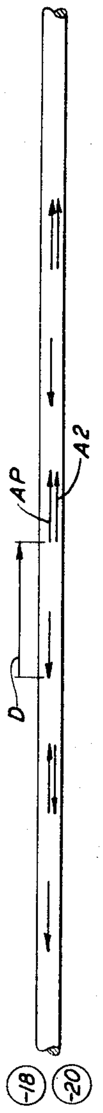
Figure 10:
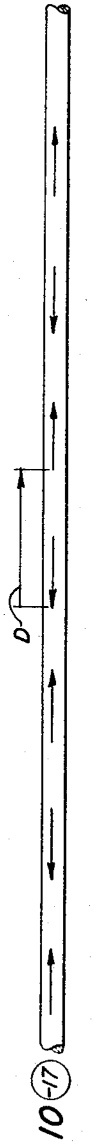
Figure 11:
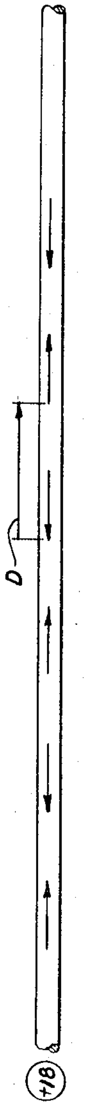
Figure 12:
Figure 13:
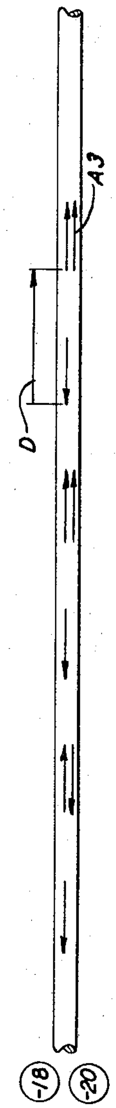

Recall from FIGS. 2 and 3 that a positive coded pulse I*c*1 provides the field configuration of FIG. 2 while a negative pulse I*c*2, or I*c*3, provides the configuration of FIG. 3. FIGS. 5, 9, and 13 show the appropriate fields due to the coded pulses I*c*1, I*c*2, and I*c*3, respectively, superimposed on the propagation fields.

The advance of the reverse domain in the presence of these superimposed coded fields is now discussed briefly to show that the domain is in fact propagated for coded pulses of appropriate polarities. Then it will be shown that a coded pulse of inappropriate polarity, that is a mismatch, inhibits propagation causing the collapse of the domain in response to the propagation pulse next succeeding the mismatch.

The illustrative initial position of reverse domain D is shown in FIG. 4. The domain is moved to the position shown in FIG. 5 in response to the positive propagation pulse applied to propagation conductor 17 as shown in FIG. 4. Now the leading domain wall of the domain encounters the "coded" field applied concurrently with that due to the negative propagation pulse applied to conductor 18. The encountered coded field is represented by an arrow deisgnated A1 in FIG. 5 and is in a direction to promote propagation, being in the same direction as the propagation field at that position as shown by the arrow AP there. The coded input pulse generating the coded field is represented by the encircled +20 indicating a positive pulse on conductor 20. The domain D advances in response to succeeding propagation pulses, in a well known manner, as is shown by the different positions for the domain in FIGS. 6, 7, 8 and 9.

FIG. 9 depicts the field configuration when the next coded pulse I*c*2 is applied concurrently with the next negative propagation pulse applied to conductor 18. The coded pulse is negative and is represented by an encircled −20 to the left of the representation of wire 11 in FIG. 9. The field generated by that pulse is as represented in FIG. 3 and is shown superimposed on the propagation field in FIG. 9. The arrow designated A2 in FIG. 9 represents the effective portion of that field, that is, that field influencing the leading domain wall of the reverse domain D. Once again the coded field is in a direction corresponding to that of the propagation field at that position as shown by the arrow AP there and thus aids propagation.

The reverse domain again advances in response to the propagation pulses as depicted by the position of domain D successively further to the right as viewed in FIGS. 10 through 13. FIG. 13, further, depicts the field configuration when the next coded pulse Ic3 is applied concurrently with the next negative propagation pulse applied to conductor 18. This coded pulse also is negative and is represented, as before, by an encircled −20. The field generated by that pulse is represented, again, in FIG. 3 and is shown superimposed on the propagation field in FIG. 13. The arrow designated A3 in FIG. 13 represents the now effective portion of that field. Here too, the coded field is in a direction to enhance propagation.

Figure 14:
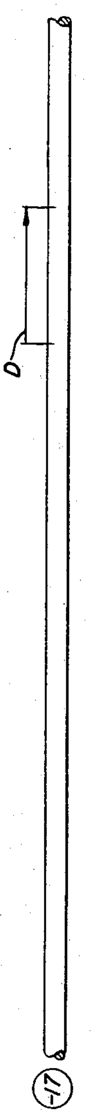

The final position of the reverse domain is illustrated in FIG. 14 at which position the sense conductor 11 of FIG. 1 is assumed present. The reverse domain passing this position, in response to further propagation pulses, induces a pulse in sense conductor 13 for detection by utilization circuit 15 under the control of control circuit 23. As is well known, in practice an output pulse is induced in conductor 13 by each domain wall bounding a reverse domain.

Figure 6:
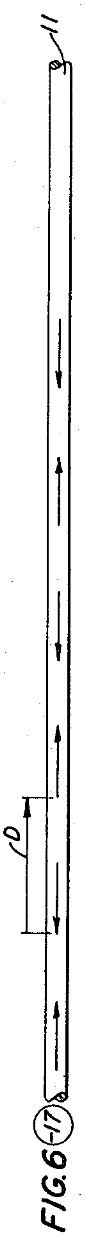
Figure 7:
Figure 8:
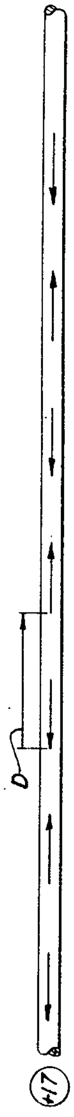
Figure 16:
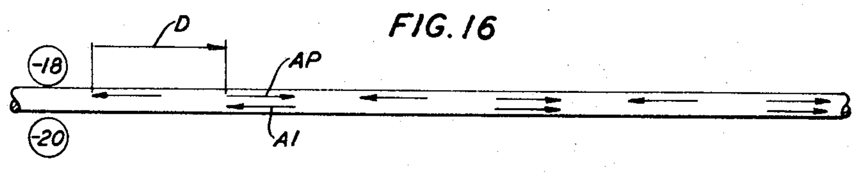
FIGS. 16, 17, and 18 are schematic illustrations of the word recognizer of FIG. 1 showing the results of an incorrectly coded input, in accordance with this invention.
Figure 17:
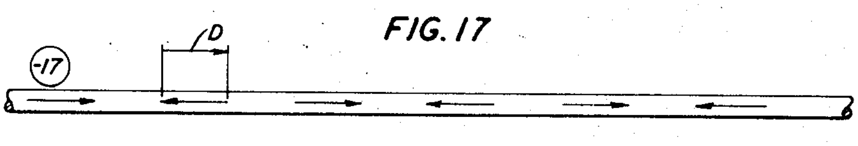
Figure 18:
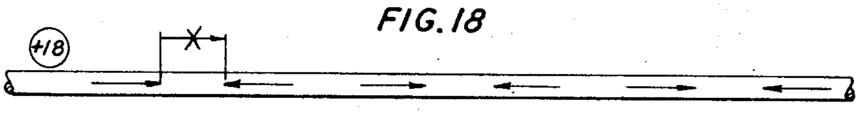

As described, a properly coded word was recognized and an output was detected. Now what happens when an improperly coded word is received? For example, what happens when the word 000 is received? The word difference encountered by an advancing domain may be understood with reference to FIGS. 5 and 16. Instead of a correct positive input pulse as represented in FIG. 5, we have an incorrect negative input pulse. The latter pulse, and corresponding field configuration, is represented as in FIG. 16 by the encircled −20 and by the superimposed negative coded field (of FIG. 3), respectively. A comparison of FIGS. 5 and 16 reveals that the field of interest, designated A1 in FIG. 16, is now reversed from that shown in FIG. 5 to a direction opposite to the propagation field (arrow AP) at that position. A coded field in this direction and in the designated position at the designated time inhibits domain wall propagation. To this end, the fields generated by coded input pulses have amplitudes in excess of those of the propagation pulses. In addition, those fields are limited to below a value such that when the coded field aids the propagation field the two fields, collectively, are insufficient to nucleate reverse domains. The demise of a reverse domain, inhibited as described, is portrayed in connection with FIGS. 17 and 18. As a result of the mismatch the reverse domain is not moved to the right as shown in FIG. 6 but only contracted from the left. The resulting domain is shown in FIG. 17 and is seen to be "half-sized" when compared to the domain in FIG. 6. The half-sized domain lies within the extent of one coupling of propagation conductor 17 which when that conductor is next pulsed (negatively) as shown in FIG. 17 collapses the domain. The collapsed domain is represented in FIG. 18 by a bounded arrow with an X through it. It may be appreciated that the description of a mismatched first bit of a word to be recognized is applicable regardless of later bits. Thus, the description is identical for the fate of the reverse domain for each of the incorrect words 000, 010, 001, and 011. For mismatched second and third bits, the fate of the reverse domain is entirely analogous. A mismatch is characterized by the absence of an output for the detection of which utilization circuit may include, for example, an AND circuit suitably energized.

There is a tendency for aiding propagation and coded fields in accordance with this invention to accelerate and even to expand reverse domains beyond the speed and length thereof due to the propagation field alone. Such an effect is consistent with prior art considerations. The normal propagation process between (in time) succeeding coded fields normalizes the timing and length of the reverse domains so affected, however, and no troublesome results occur.

A word recognizer, in accordance with this invention, lends itself to many adaptations. For example, the coded conductor 20 of FIG. 1, although wired in a particular code is amenable to alteration of that code by placing the coils of conductor 20 about wire 11 individually with a pair of leads protruding from each coil. Such an arrangement may be mated with plug-in boards which implement the interconnection of the coils in coded fashion. Moreover, individual word recognizers, conveniently in ten bit lengths, may be plugged into one another for providing word recognizers of, for example, multiples-of-ten lengths. It may be appreciated also that a continuation of the illustrative structure beyond, for example, ten bit lengths allowing for multiple sense conductors coupled to the positions of the magnetic wire corresponding to, for example, each tenth bit also permits recognition of multiple codes. Consequently, a word recognizer in accordance with this invention is quite versatile. In addition, it has been found that multiple turns for the propagation couplings permit the driving thereof with, for example, 100 milliamperes power supply. This requirement is compatible with inexpensive monolithic semiconductor circuitry providing a quite economical package.

The initial position of the reverse domain as shown in FIGS. 1 and 4 is selected arbitrarily. It may be advantageous, however, to choose the initial position of the reverse domain to correspond to the first coupling of conductor 20. In this manner, an input pulse may be employed to trigger a nucleation pulse and initiate the sequence of propagation pulses simultaneously therewith in the absence of a timing pulse. Alternatively, a coded succession of pulses in a still longer sequence of input pulses may be "recognized" by nucleating a reverse domain at prescribed times after a sequence of input pulses has been initiated. For example, the last ten of twenty input pulses may be responded to as described.

It is to be understood that the invention is described in terms of a magnetic wire, domains of specific (relative) length, particular magnetization directions and a particular propagation mode. Alternatives to each of these are well known and adaptable in various combinations in accordance with this invention. For example, thin film domain wall shift registers may be used instead of wire registers. Also, materials with magnetization directions (easy axes) normal to the direction of propagation are adaptable. In addition, the domain when inhibited may be reduced below a stable length for immediate collapse rather than inhibited to a shorter stable length for collapse on the next succeeding propagation pulse. Alternatively, the coded field may exceed the propagation field by an amount to cause movement of the corresponding leading domain wall to the left rather than just inhibiting the advance thereof to the right as described. Such field amplitudes also cause immediate collapse of the domain. All these permutations, of which these few are illustrative, are contemplated within the scope of this invention.

Accordingly, what has been described is considered to be only illustrative of the principles of this invention, and various and numerous other arrangements may be devised by one skilled in the art without departing from the spirit and scope of this invention.

What is claimed is:

1. In combination with a domain wall shift register including means for propagating therealong a stable state comprising a domain wall, means responsive to coded input pulses operative concurrently with the propagating means for selectively inhibiting the propagation of said domain wall at any one of a set of preset positions therealong.

2. In combination with a domain wall shift register including means for propagating a stable state comprising a domain wall therealong from an input to a spaced apart output position by a succession of discrete advance fields, means responsive to coded input pulses operative concurrently with the propagating means for selectively inhibiting ones of said advance fields at any one of a set of preset positions therealong.

3. In combination with a domain wall shift register including means for propagating a reverse domain including first and second spaced apart domain walls therealong from an input to a spaced apart output position by a succession of discrete advance fields, means responsive to coded input pulses operative concurrently with the propagating means for selectively inhibiting the advance of said first domain wall during one of said advance fields at any one of a set of preset positions therealong such that said reverse domain collapses in response to the next succeeding advance field.

4. In combination, a magnetic medium of a material capable of maintaining a stable state comprising a first domain wall therein in response to a first field in excess of a nucleation threshold and of moving that stable state therein in response to a second field in excess of a propagation threshold and less than said nucleation threshold, nucleation means for generating said first field in a first portion of said medium, sensing means coupled to a second portion of said medium spaced apart from said first portion for detecting the arrival of stable states thereat, propagation means for providing said second field in said medium between said first and second portions thereof for moving said stable state toward said second portion, and means responsive to coded input pulses for providing a coded pattern of third fields in spaced apart positions of said medium between said first and second portions for selectively inhibiting the movement of said first domain wall while said stable state is being moved from said first to said second portion in response to said second field.

5. A combination in accordance with claim 4 wherein said stable state comprises a reverse domain including first and second spaced apart domain walls.

6. A combination in accordance with claim 5 wherein said medium is a magnetic wire and said propagation means comprises first and second propagation conductors having interleaved windings about said wire, adjacent windings of each propagation conductor having opposite polarities.

7. A combination in accordance with claim 6 wherein said means responsive to coded input pulses comprises an input conductor including a plurality of windings coupled to said magnetic wire at those positions thereof coupled by alternate windings of said first propagation conductor.

8. A combination in accordance with claim 7 including means connected to said input conductor for applying thereto coded pulses representing a sequence of binary bits.

9. A combination in accordance with claim 8 wherein the polarities of said plurality of windings of said input conductor are coded such that said pulses representing a sequence of binary bits produce coded fields for inhibiting the propagation of said first domain wall in response to a mismatch between an input pulse and the corresponding winding sense.

References Cited

UNITED STATES PATENTS 3,241,127 3/1966 Snyder ------------ 340—174

JAMES W. MOFFITT, *Primary Examiner.*